(12) United States Patent
Hilbrink et al.

(10) Patent No.: US 9,131,043 B2
(45) Date of Patent: Sep. 8, 2015

(54) SYSTEM AND METHOD FOR PROVISION OF INFRARED SIGNALLING IN SMART PHONE DEVICES

(71) Applicant: UNIVERSAL ELECTRONICS INC., Santa Ana, CA (US)

(72) Inventors: Marcel Hilbrink, Singapore (SG); Patrick H. Hayes, Mission Viejo, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 0 days.

(21) Appl. No.: 14/188,866

(22) Filed: Feb. 25, 2014

(65) Prior Publication Data

US 2014/0171148 A1  Jun. 19, 2014

Related U.S. Application Data

(63) Continuation of application No. 13/043,915, filed on Mar. 9, 2011, now Pat. No. 8,700,106.

(51) Int. Cl.
| | |
|---|---|
| *H04M 1/737* | (2006.01) |
| *H04M 1/215* | (2006.01) |
| *H04M 1/725* | (2006.01) |
| *H04M 1/02* | (2006.01) |
| *H04M 1/60* | (2006.01) |

(52) U.S. Cl.
CPC ............ *H04M 1/215* (2013.01); *H04M 1/026* (2013.01); *H04M 1/72533* (2013.01); *H04M 1/737* (2013.01); *H04M 1/6058* (2013.01)

(58) Field of Classification Search
USPC ............ 455/552.1, 553.1, 556.1, 41.1–41.3, 455/575.1–575.9; 342/53; 359/350; 340/870.28–870.29; 439/668, 620, 439/669, 188, 108; 385/88–94
See application file for complete search history.

(56) References Cited

U.S. PATENT DOCUMENTS

| | | | |
|---|---|---|---|
| 6,483,712 | B1 | 11/2002 | Oliphant et al. |
| 6,641,309 | B2 | 11/2003 | Gancarcik et al. |
| 6,701,091 | B2 * | 3/2004 | Escobosa et al. ............ 398/107 |
| 7,231,204 | B1 | 6/2007 | Osborn et al. |
| 7,338,193 | B1 | 3/2008 | Zeiger et al. |
| 7,670,170 | B2 | 3/2010 | Henry et al. |
| 7,896,708 | B2 | 3/2011 | Agevik |
| 2002/0018002 | A1 | 2/2002 | Stippler |
| 2003/0119369 | A1 | 6/2003 | Nakai et al. |
| 2004/0043668 | A1 | 3/2004 | Ikuta |

(Continued)

OTHER PUBLICATIONS

European Patent Office, extended European Search Report issued on European patent application No. 12754241.3, dated May 26, 2014, 8 pages.

*Primary Examiner* — Daniel Lai
(74) *Attorney, Agent, or Firm* — Greenberg Traurig, LLP

(57) ABSTRACT

A smart phone device is fitted with a dual mode communications interface device having a housing wherein the housing provides access via an exterior of the smart phone device to both an infrared communications pathway and an electrical communications pathway each of which are coupled to one or more processing devices carried within the smart phone device. To this end, the communications interface device may be in the form of an audio jack having a plug receiving opening wherein the plug receiving opening is in communication with the electrical communications pathway and wherein at least a portion of the housing surrounding the plug receiving opening forms a light pipe for the infrared communications pathway.

10 Claims, 6 Drawing Sheets

(56) References Cited

U.S. PATENT DOCUMENTS

| | | |
|---|---|---|
| 2005/0020140 A1 | 1/2005 | Zhang et al. |
| 2005/0100285 A1 | 5/2005 | Han et al. |
| 2007/0003192 A1 | 1/2007 | Wang et al. |
| 2007/0155418 A1 | 7/2007 | Shau et al. |
| 2007/0227864 A1* | 10/2007 | Tsai .............................. 200/293 |
| 2008/0064374 A1 | 3/2008 | Coffing |
| 2008/0178224 A1 | 7/2008 | Laude et al. |
| 2008/0295017 A1 | 11/2008 | Tseng et al. |
| 2009/0110404 A1 | 4/2009 | Agevik |
| 2010/0226509 A1 | 9/2010 | Filson et al. |

* cited by examiner

SYSTEM AND METHOD FOR PROVISION OF INFRARED SIGNALLING IN SMART PHONE DEVICES

RELATED APPLICATION INFORMATION

This application claims the benefit of and is a continuation of U.S. application Ser. No. 13/043,915, filed on Mar. 9, 2011, the disclosure of which is incorporated herein by reference in its entirety.

BACKGROUND

Personal communication, productivity, and entertainment devices such as cellular phones, portable email devices, tablet computers, e-books, hand-held games, portable media players, etc. (all referred to hereafter as "smart phones") are known to include features such as graphical user interfaces on color touch screens, wireless Internet capability, support for ancillary applications (sometimes referred to as "apps") such as, for example, calendars, email, maps and navigation, etc. Such ancillary applications may be pre-installed in a smart phone or may be made available for download by a user. Certain such apps may comprise an ability to issue commands to entertainment and other appliances, for example in conjunction with a GUI offering the features and functionality of a universal remote control as known in the art, in conjunction with a TV guide display to enable channel selection, etc. Since many appliance command protocols comprise transmission of a pulse train modulated onto an infrared ("IR") carrier signal, it is desirable that smart phones be equipped with an IR transmitting means to support such apps. For example, U.S. Pat. No. 7,231,204 illustrates and describes a personal digital assistant ("PDA") having an IR device (64) which is attached to a serial port (108) of the PDA.

SUMMARY OF THE INVENTION

This invention relates generally to a system and method for implementation of certain hardware elements required to support IR signal generation in smart phones, and more particularly to cost-effective and space conserving methods for provisioning of an IR transmitter diode. To this end, in an illustrative embodiment presented herein, a connector opening in the outer case of a smart phone may be fitted with a connector body which serves not only the original purpose for which the opening was intended, but also doubles as a light pipe to disseminate IR signals generated by an IR emitter diode located internal to the smart phone device.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
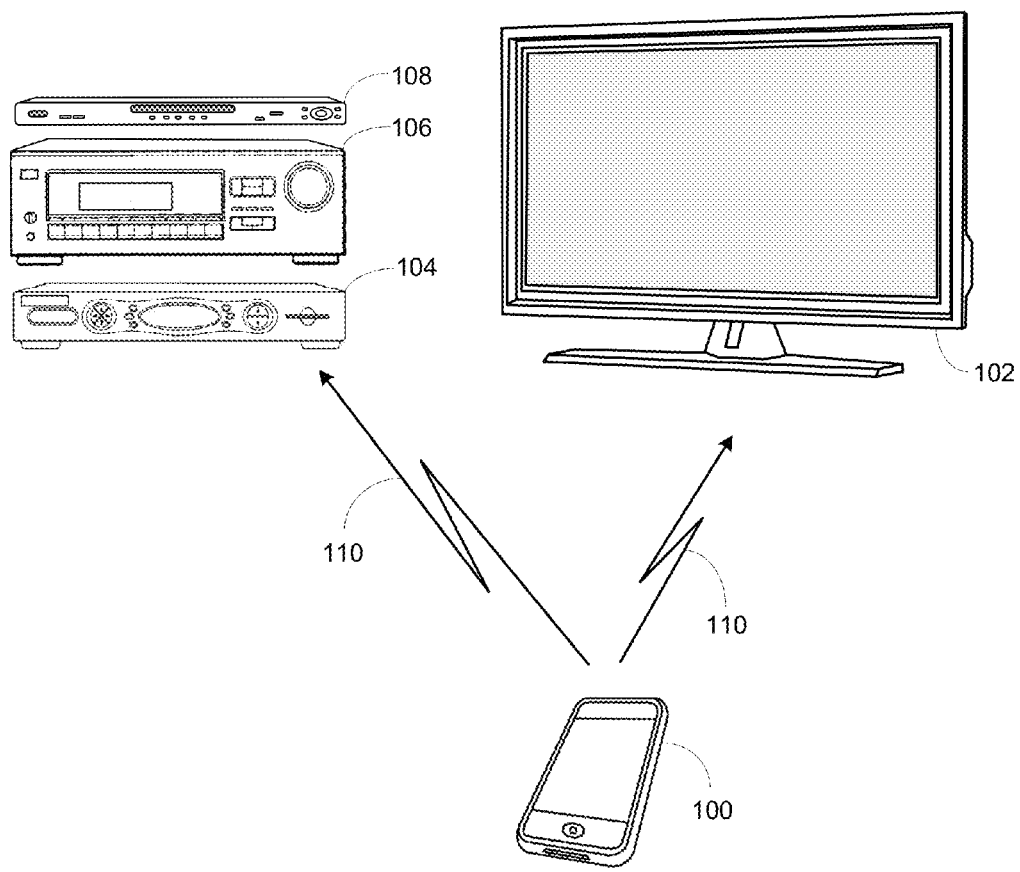
FIG. 1 illustrates an exemplary system in which an exemplary smart phone may be used as a controlling device.

Turning now to FIG. 1, there is illustrated an exemplary system in which a smart phone device 100 is equipped to control various controllable appliances, such as a television 102, a set top box ("STB") 104, an AV receiver 106, and a DVD payer 108. As is known in the art, the smart phone device may be capable of transmitting commands to the appliances, using appropriate infrared ("IR") signals 110 recognizable by the target appliances, to cause the appliances to perform one or more operational functions. While illustrated in the context of a television 102, STB 104, AV receiver 106, and DVD player 108 it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
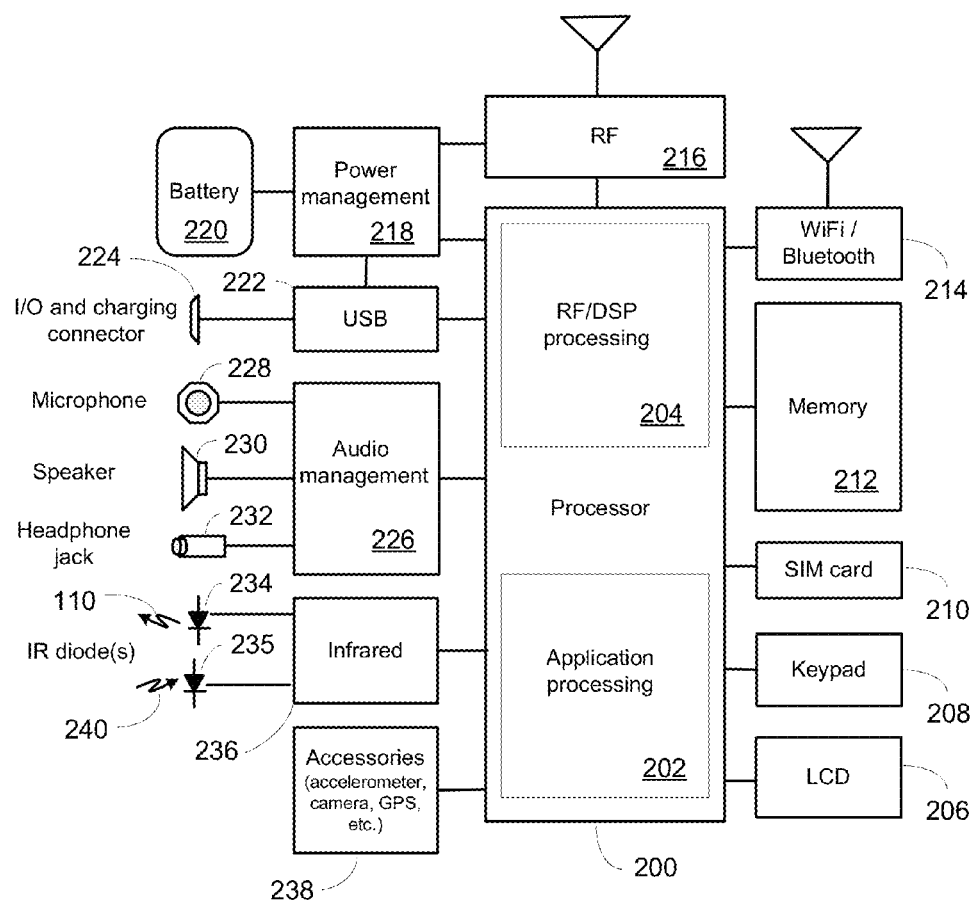
FIG. 2 illustrates in block diagram form the major components of the exemplary smart phone device of FIG. 1.

With reference to FIG. 2, as is known in the art, a smart phone device 100 may include as needed for a particular application, processing means 200 which may comprise both an application processing section 202 and an RF/DSP processing section 204; an LCD display 206; a keypad 208 which may comprise physical keys, touch keys overlaying LCD 206, or a combination thereof; a subscriber identification module (SIM) card 210; memory means 212 which may comprise ROM, RAM, Flash, or any combination thereof; WiFi and/or Bluetooth wireless interface(s) 214; a wireless telephony interface 216; power management circuitry 218 with associated battery 220; a USB interface 222 and connector 224; an audio management system 226 with associated microphone 228, speaker 230, and headphone jack 232; optional IR communication means comprising a transmitter and/or receiver 236 with associated IR output diode(s) 234 and input diode(s) 235; and various optional accessory features 238 such as a digital camera, GPS, accelerometer, etc.

In order to increase the utility of such devices, it is known to offer an app which allows use of the smart phone to transmit commands suitable for operation of entertainment and other appliances. In many instances, such an app may draw on a library of codes and data suitable for commanding the functional operations of various types of appliances of multiple manufactures and/or models, i.e., a library of remote control code sets for a so-called "universal" controller, as well known in the art. In other instances, a particular app may be suitable for the control of only a specific target device or group of devices, such as those offered by one manufacturer, those intended to perform a particular function, etc., i.e., a library of one or more remote control code sets for a so-called "dedicated" controller. Various methods for physical implementation of such command transmissions are known: for example, an IR communication means 236 may be incorporated into a smart phone 100. IR communication means 236 may take the form of a self-contained microcontroller IC which includes both programming and a code library suitable for generating appropriately encoded pulse streams in response to functional commands received from application processing means 202. Alternatively, IR communication means 236 may take the form of a simple driver circuit responsive to a pulse stream output generated directly by programming within application processing means 202 utilizing a command code library stored in smart phone memory 212. Other permutations are also possible, for example functionality may be divided, with transmission formatting and encoding being performed by a microcontroller comprising IR transmitter 236 in response to command data input retrieved by application processing means 202 from memory 212.

Figure 3A:
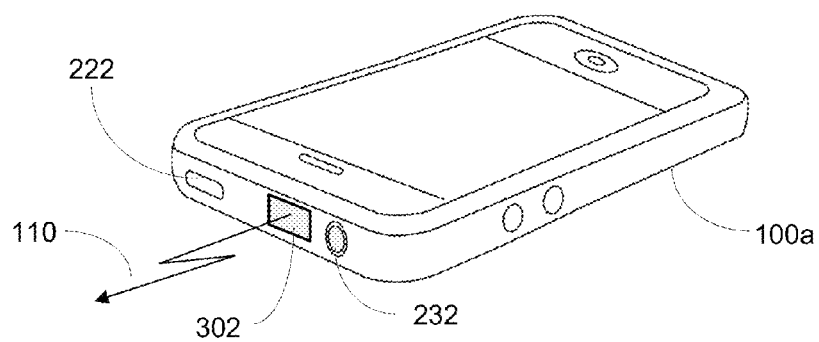
FIGS. 3a and 3b illustrate exemplary smart phone devices according to the prior art.
Figure 3B:
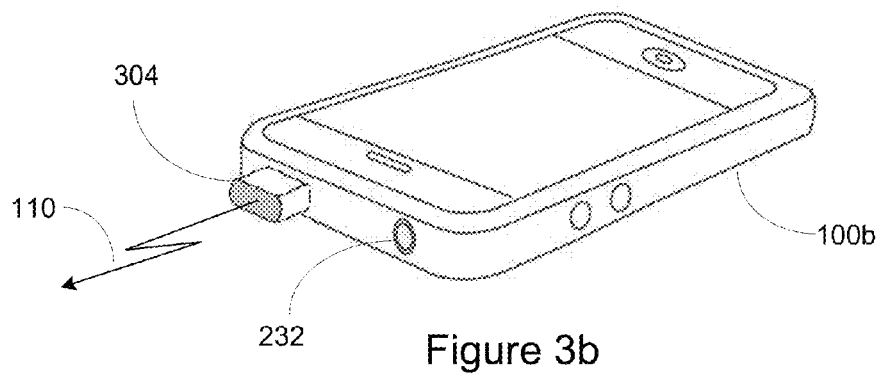

Regardless of the exact method by which it is generated, the final modulated IR signal 110 to be transmitted to a target controlled appliance may be radiated by an IR emitting diode 234. Accordingly, provision must be made for radiation from IR emitter diode 234 to escape the outer case of smart phone 100. Additionally, in those embodiments in which bidirectional IR communication is desired, provision must also be made for incoming IR signals 240 to reach an IR detector 235. Turning now to FIG. 3, it is known in the art to provide an IR-transparent window 302, for example of tinted polycarbonate or acrylic plastic, on the front edge of a smart phone 100a, with an IR emitter diode (or diodes) 234 positioned on an internal circuit board immediately behind window 302. However, provision of such a window may be problematic in some implementations, requiring tooling changes to add this feature to an existing case design, as well as allocation of valuable case-edge real estate. Accordingly, it is also known in the art to provide an add-on adapter 304 containing an IR emitter diode 234 (and in some embodiments all or part of IR transmitter 236 as well), which adapter may be attached to a smart phone 100b for example to USB port 224 as illustrated, to headphone jack 232, or to any other suitable externally-accessible connector. Such solutions, while compatible with existing tooling, incur the disadvantages of additional cost and componentry together with the user inconvenience of having to purchase and attach an accessory device while also sacrificing the original functionality for which the connector was intended.

Figure 3C:
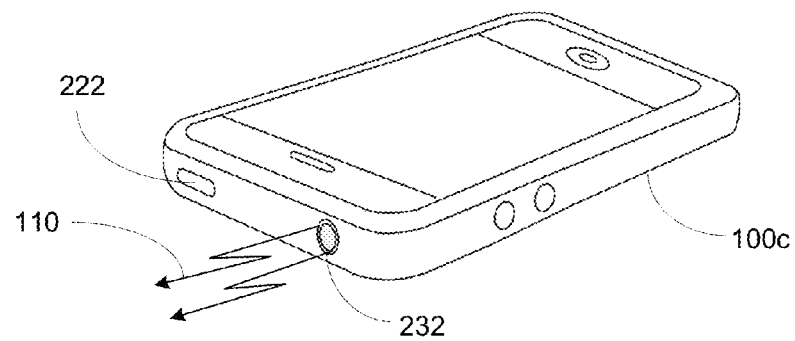
FIG. 3c illustrates an exemplary smart phone device according to the instant invention.

To overcome these disadvantages, the instant invention proposes adapting an existing connector opening in the outer case of smart phone 100c for dual purpose use as shown in FIG. 3C. In an exemplary embodiment presented hereafter, the plastic housing of a headphone jack may be adapted to serve as a light pipe to guide and disseminate the radiation 110 from an internally-located IR emitter diode 234.

Figure 4A:
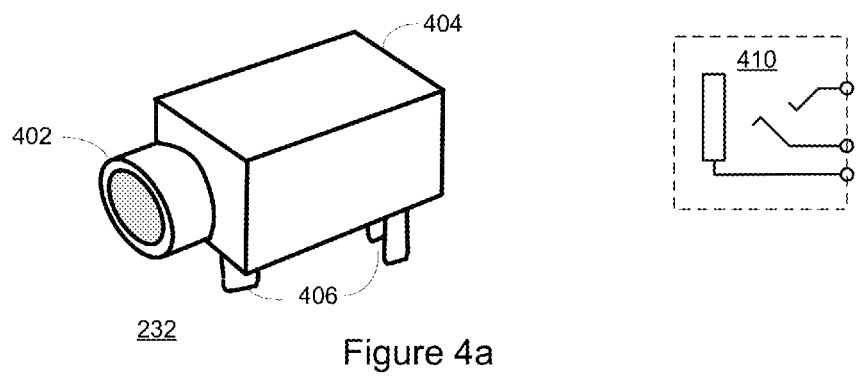
FIG. 4a illustrates an exemplary headphone connector mechanism according to the prior art.
Figure 4B:
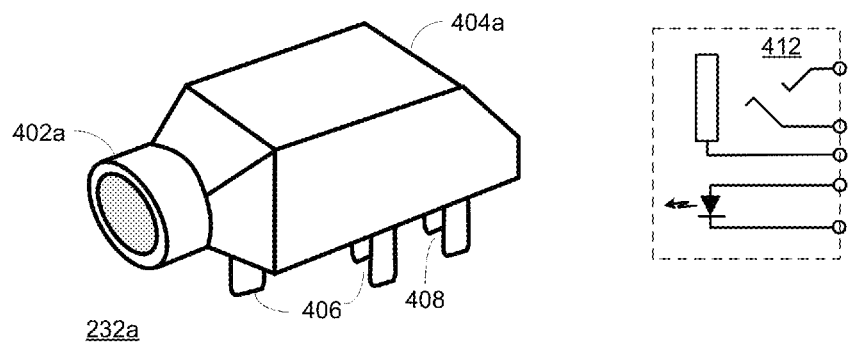
FIGS. 4b and 4c illustrate exemplary headphone connector mechanisms according to the instant invention.
Figure 4C:
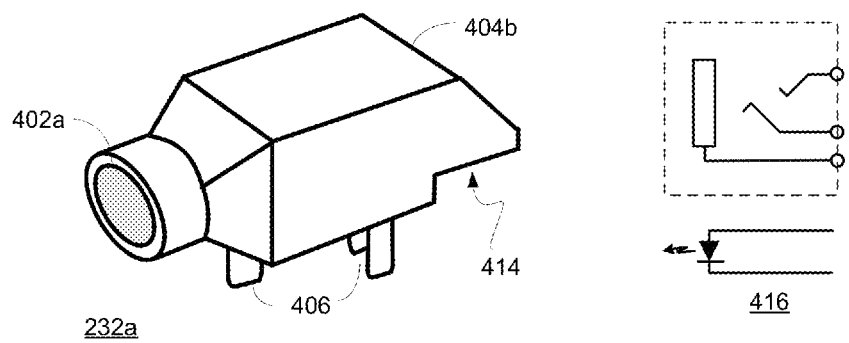

Turning now to FIG. 3C as well as FIGS. 4a through 4c, FIG. 4a illustrates a headphone jack component 232 such as may be found in prior art smart phones 100a or 100b. Headphone jack 232 comprises a receptacle 402 which may protrude through an opening in the outer case of smart phone 100a or 100b and forms part of a housing 404 which may be mounted to a printed circuit board via connector tabs 406. As illustrated by the circuit representation 410 of this component, tabs 406 are in electrical connection with a set of internal contacts designed to mate with a matching headphone connector.

FIG. 4b illustrates a headphone jack component 232a constructed in accordance with the instant invention. Housing 404a may be of a material which is suitable to act as a light pipe in at least the infrared portion of the spectrum and may be adapted to accommodate an IR emitter diode 234 such that IR emissions are guided through the housing material and caused to exit via the outer face of receptacle 402a, for example in the manner illustrated in FIG. 5c, i.e., the housing 404a includes surfaces that are arranged to guide, reflect, and otherwise direct the infrared emission from the IR source to the IR outlet 402a. As indicated by the circuit representation 412 of this component and by the illustrative internal componentry view presented in FIG. 5a, for ease of assembly headphone jack component 232a may incorporate a built-in IR emitter diode 234 into its structure, with additional pins 408 available to connect IR emitter diode 234 to infrared transmitter means 236.

Figure 5A:
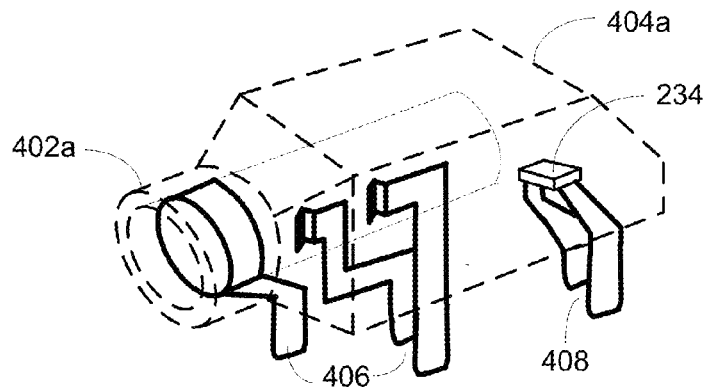
FIG. 5a illustrates the internal configuration of the headphone connector mechanism of FIG. 4b.
Figure 5B:
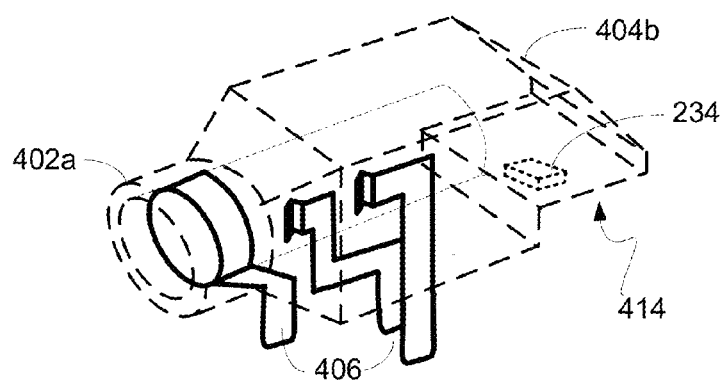
FIG. 5b illustrates the internal configuration of the headphone connector mechanism of FIG. 4c.
Figure 5C:
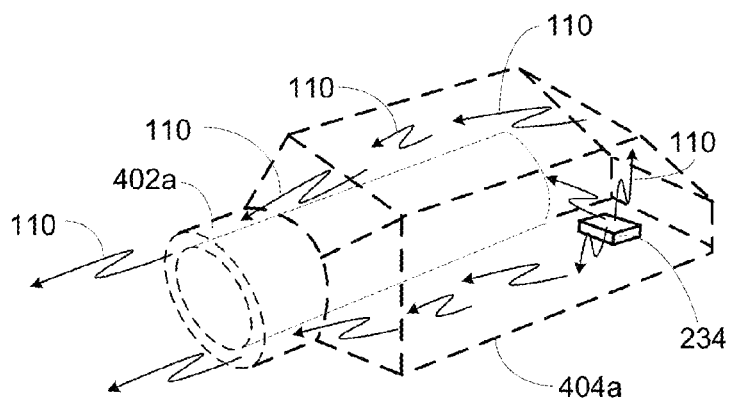
FIG. 5c illustrates the light guide functionality of the connectors of FIG. 5a or 5b.
Figure 6:
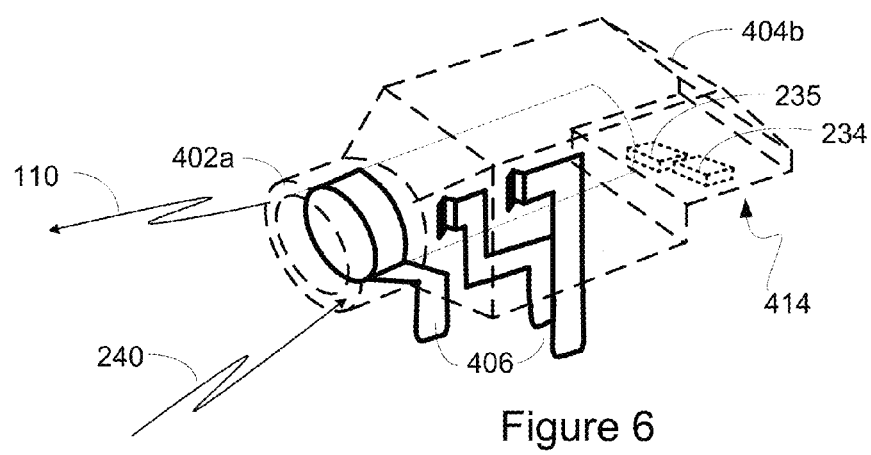
FIG. 6 illustrates an alternative utilization of the headphone connector mechanism of FIGS. 4c and 5b.

In an alternative embodiment illustrated in FIGS. 4c and 5b, a housing 404b of headphone jack component 232a may incorporate a notch 414 in the base of housing 404b, wherein beneath the notch and directly adjacent to the housing 404b an IR emitter diode component 234 may be positioned, for example mounted to the printed circuit board prior to placement of headphone jack component 232a. In this regard, the IR emitter diode is placed into light communication with the housing 404b. The circuit representation of such an arrangement is illustrated at 416. As illustrated in FIG. 6, when appropriate for a particular embodiment the light pipe of FIGS. 4c and 5b may be readily adapted to support bidirectional IR communication by the additional placement of an IR receiver component 235 beneath notch 414 and directly adjacent to housing 404b. Bidirectional IR communication may also be facilitated by placement of an IR receiver component 235 within the housing in a manner similar to which the IR transmitter 234 is placed within the housing as illustrated in FIG. 5a.

Figure 7:
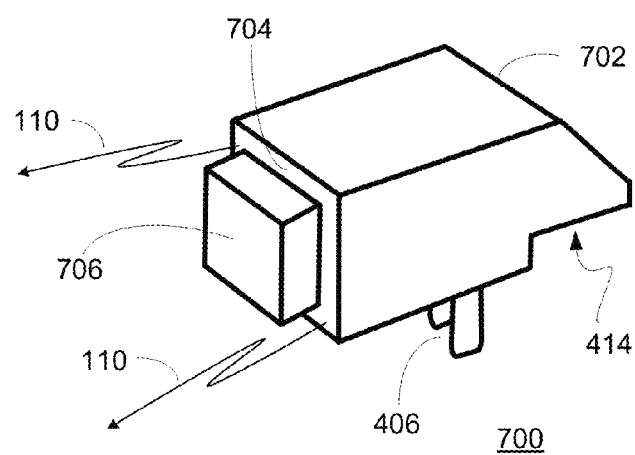
FIG. 7 illustrates an alternative smart phone component in which the teachings of the instant invention may be embodied.

Turning to FIG. 7, in yet further illustrative embodiment the housing 702 of an exemplary pushbutton switch component 700 may be adapted to guide IR emissions through the housing material and to exit via the outer flange 704 of pushbutton 706. While illustrative housing 702 comprises a notch 414 beneath which one or more IR emitters or receivers may be positioned as described above in conjunction with the embodiment of FIG. 5b, it will be appreciated that other configurations are also possible, for example provision of an internal IR emitter as in the embodiment of FIG. 5a, fabrication of all or part of the button 706 itself from a material suitable to act as light pipe, etc.

While various concepts have been described in detail, it will be appreciated by those skilled in the art that various modifications and alternatives to those concepts could be developed in light of the overall teachings of the disclosure. For example, in certain embodiments the external surface of a headphone jack, pushbutton switch, or other component housing according to this invention may be furnished with a reflective coating to assist or enhance the light pipe effect. Additionally, it will be appreciated that various alternate shapes and configurations of component housing and various alternate positions for IR emitter diode placement may be used equally effectively. Also, while a exemplary embodiment based upon adaption of a headphone jack connector or a pushbutton switch to guide emissions from an IR transmitter diode are presented herein by way of illustration, it will be appreciated that the teachings of the instant invention may be applied with equal success to any other connector or component which protrudes through the outer casing of a smart phone and/or may be further adapted to provide for the transfer of light signals in other parts of the spectrum, for example human-visible emissions from a conventional LED for the purposes of user guidance or feedback.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A portable electronic device, comprising:
    a device housing having a first opening and a second opening;
    a processing device carried within the device housing;
    a wired communications module coupled to the processing device, the wired communications module terminating in a wired communications interface that is disposed in the first opening of the device housing;
    an infrared communications module coupled to the processing device, the infrared communications module terminating in an infrared emitter; and
    a user activatable input element comprised of a switch housing and an electro-mechanical switching element, wherein the switch housing is disposed within the second opening of the device housing, the electro-mechanical switch element is carried by the switch housing so as to be accessible from an the exterior of the device housing, and the infrared emitter of the infrared communications module is coupled to an exterior surface of the switch housing that is interiorly located within the device housing.

2. The portable electronic device as recited in claim 1, wherein the exterior surface of the switch housing has a notch into which is received the infrared emitter.

3. The portable electronic device as recited in claim 1, wherein the electro-mechanical switch element comprises a push-button type switch.

4. The portable electronic device as recited in claim 1, wherein the infrared communications module terminates in an infrared receiver and wherein the infrared receiver of the infrared communications module is coupled to an exterior surface of the switch housing that is interiorly located with the device housing.

5. The portable electronic device as recited in claim 4, wherein the exterior surface of the switch housing has at least one notch into which is received the infrared emitter and the infrared receiver.

6. The portable electronic device as recited in claim 4, wherein a single infrared diode functions as the infrared emitter and the infrared receiver.

7. The portable electronic device as recited in claim 6, wherein the exterior surface of the switch housing has a notch into which is received the single infrared diode.

8. The portable electronic device as recited in claim 1, wherein the portable electronic device comprises a smart phone.

9. The portable electronic device as recited in claim 1, wherein one or more interiorly disposed surfaces of the switch housing are rendered reflective.

10. The portable electronic device as recited in claim 1, wherein the housing comprises one or more surfaces that form a light pipe and wherein the light pipe couples the infrared emitter to a surface of the switch housing that is accessible from the exterior of the device housing.

* * * * *